(12) United States Patent
Chen

(10) Patent No.: US 11,082,496 B1
(45) Date of Patent: Aug. 3, 2021

(54) ADAPTIVE NETWORK PROVISIONING

(71) Applicant: International Business Machines Corporation, Armonk, NY (US)

(72) Inventor: Hsiulan Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/938,943

(22) Filed: Jul. 25, 2020

(51) Int. Cl.
*H04L 29/08* (2006.01)
*H04L 12/24* (2006.01)
*H04L 12/46* (2006.01)
*G06F 16/27* (2019.01)

(52) U.S. Cl.
CPC .......... *H04L 67/1097* (2013.01); *G06F 16/27* (2019.01); *H04L 12/4641* (2013.01); *H04L 41/082* (2013.01); *H04L 41/0843* (2013.01); *H04L 41/0859* (2013.01)

(58) Field of Classification Search
CPC .......... G06F 16/20; G06F 16/27; G06F 16/30; H04L 41/0856; H04L 41/0859; H04L 67/1097; H04L 41/082; H04L 41/0843; H04L 12/4641
See application file for complete search history.

(56) References Cited

U.S. PATENT DOCUMENTS 7,352,853 B1 4/2008 Shen et al.
7,984,131 B1 * 7/2011 Gandhi ............... H04L 67/1097
709/223
2006/0047793 A1 3/2006 Agrawal et al.
2014/0122427 A1 * 5/2014 Dary ...................... G06F 16/27
707/620

FOREIGN PATENT DOCUMENTS

CN 105450450 B 7/2019

OTHER PUBLICATIONS

Shufan, "Autonomic Network Configuration Using Machine Learning," Beihang University, Computer Science and Engineering Department, Printed Jun. 22, 2020, 29 pages, https://datatracker.ietf.org/meeting/94/materials/slides-94-nmlrg-2.

(Continued)

*Primary Examiner* — Kyung H Shin
(74) *Attorney, Agent, or Firm* — Peter Edwards

(57) ABSTRACT

A method, system, and computer program product for adaptive network provisioning. The method may include determining that a physical infrastructure is updated. The method may also include determining, in accordance with the determination that the physical infrastructure is updated, active configuration information for configuring an updated physical infrastructure to provision a virtual network. The method may also include obtaining historical configuration information for configuring the physical infrastructure to provision the virtual network, where the historical configuration information is generated based on a configuration template. The method may also include determining differential information between the active configuration information and the historical configuration information. The method may also include updating the configuration template based on the determined differential information. The system and computer program product may include similar steps.

20 Claims, 8 Drawing Sheets

(56) References Cited

OTHER PUBLICATIONS

Cronin et al., "Self Adaptive Module for Maintaining Network Compatibility," IP.Com, An IP.com Prior Art Database Technical Disclosure, Original Publication Date: Mar. 18, 2009, IP.com No. IPCOM000180849D, IP.com Electronic Publication Date: Mar. 18, 2009, 5 pages, https://priorart.ip.com/IPCOM/000180849.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

ADAPTIVE NETWORK PROVISIONING

BACKGROUND

The present disclosure relates to network technologies and, more specifically, to adaptive network provisioning.

Network virtualization is an emerging trend in data centers to enable cloud computing. In general, network virtualization may involve abstracting hardware resources of a physical infrastructure to be provisioned as virtual entities. Virtual networks may be orchestrated with the virtual entities. In some embodiments, virtual networks may be isolated from the underlying physical infrastructure, thereby allowing multiple tenants or applications to share the physical infrastructure. Network virtualization may greatly simplify network provisioning in multi-tenant or multi-application environments, as well as in traditional environments.

SUMMARY

The present invention provides a computer-implemented method, system, and computer program product for adaptive network provisioning. The method may include determining that a physical infrastructure is updated. The method may also include determining, in accordance with the determination that the physical infrastructure is updated, active configuration information for configuring an updated physical infrastructure to provision a virtual network. The method may also include obtaining historical configuration information for configuring the physical infrastructure to provision the virtual network, where the historical configuration information is generated based on a configuration template. The method may also include determining differential information between the active configuration information and the historical configuration information. The method may also include updating the configuration template based on the determined differential information. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
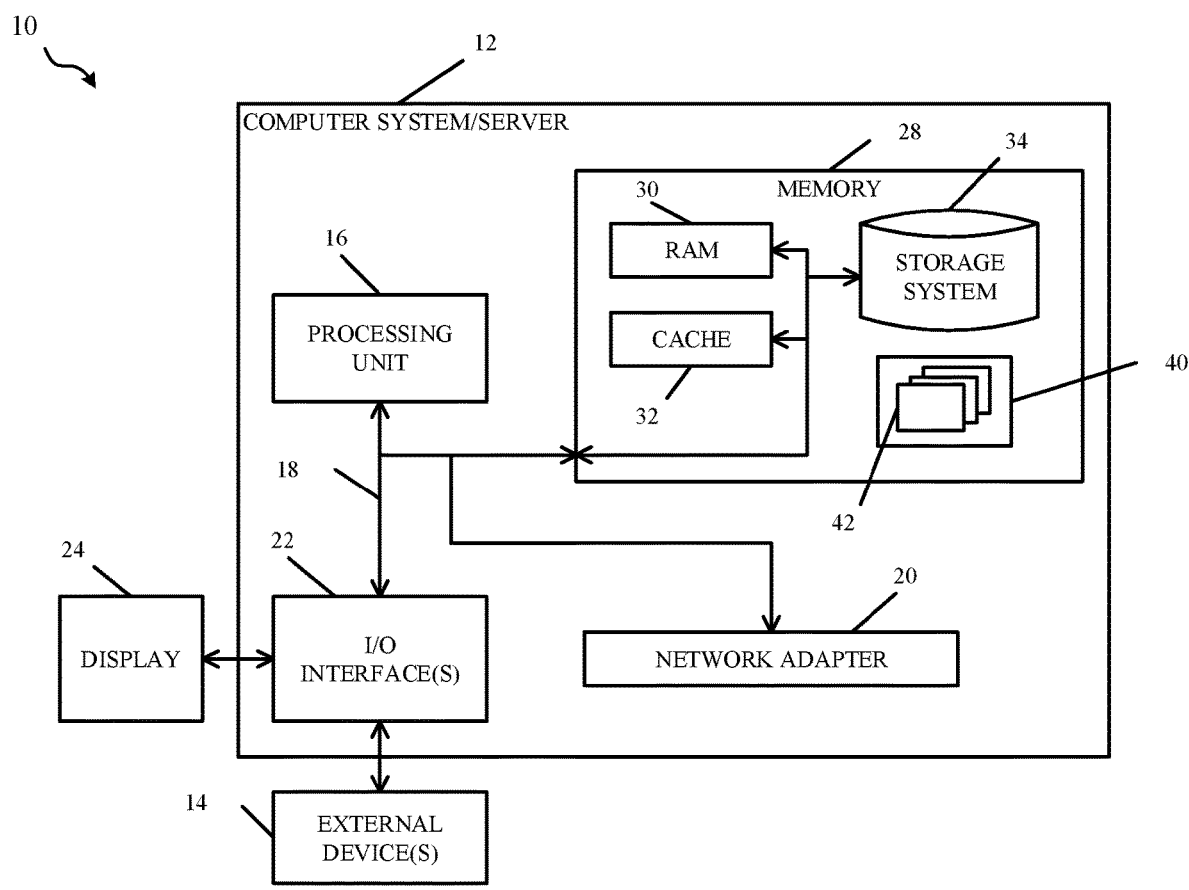
FIG. 1 depicts a block diagram of an example computer system environment, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, computer system 10 is a computer system/server 12 is shown in the form of a general-purpose computing device, according to some embodiments. In some embodiments, computer system/server 12 is located on the linking device. In some embodiments, computer system 12 is connected to the linking device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
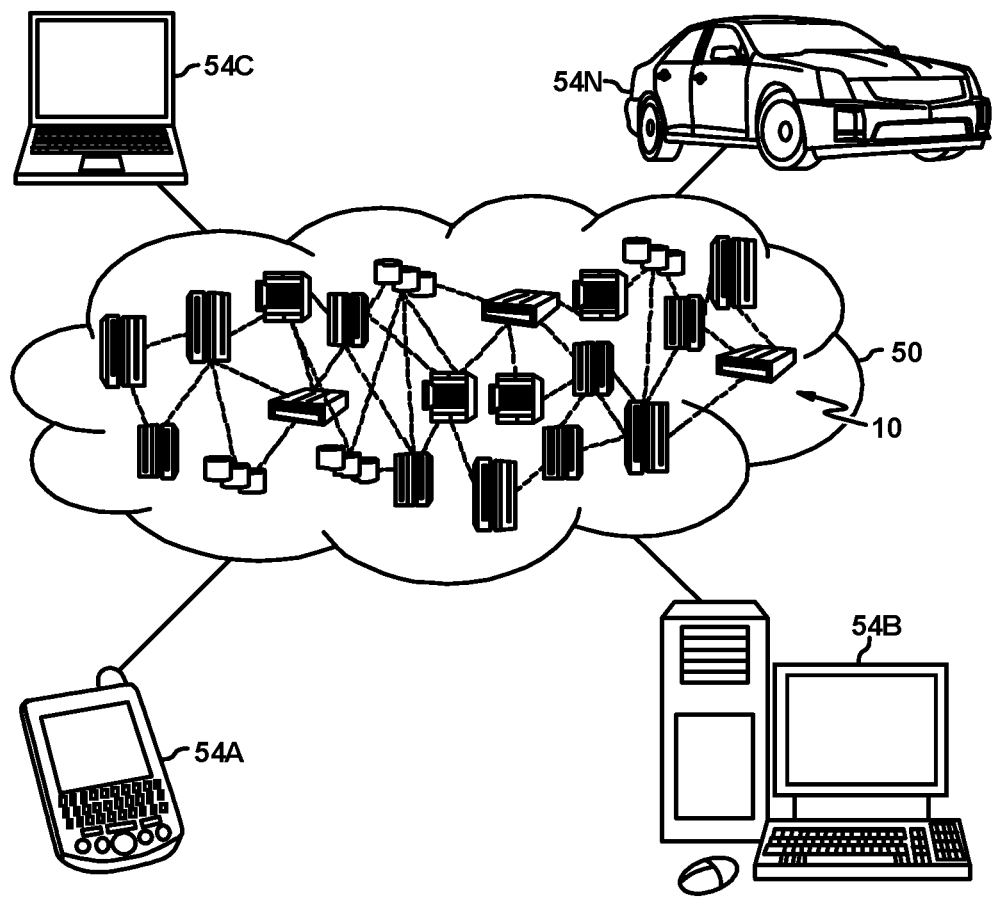
FIG. 2 depicts a cloud computing environment, according to some embodiments.
Figure 6:
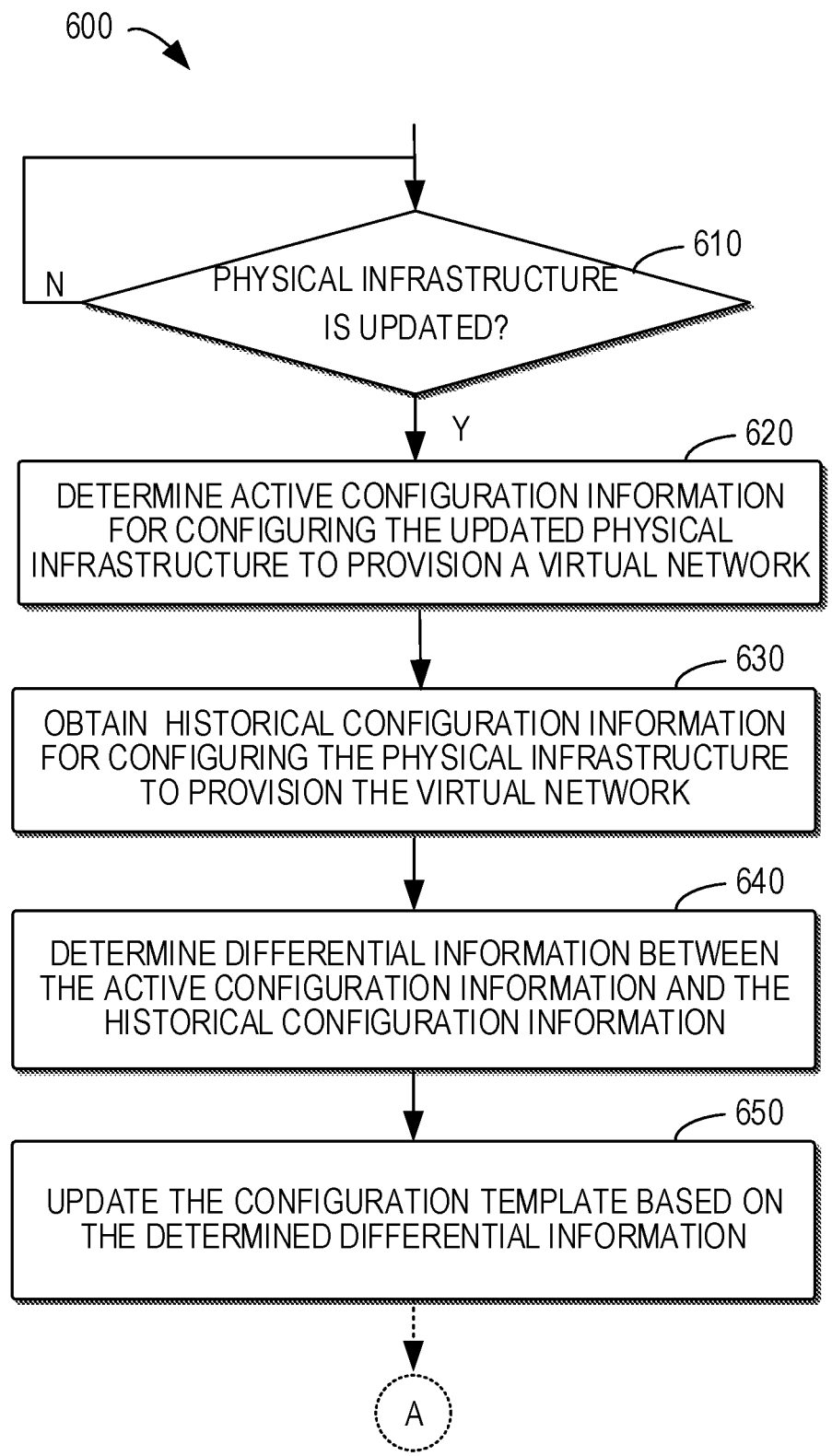
FIG. 6 depicts a flowchart of an example method of generating configuration information, according to some embodiments.

Referring to FIG. 2, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 3:
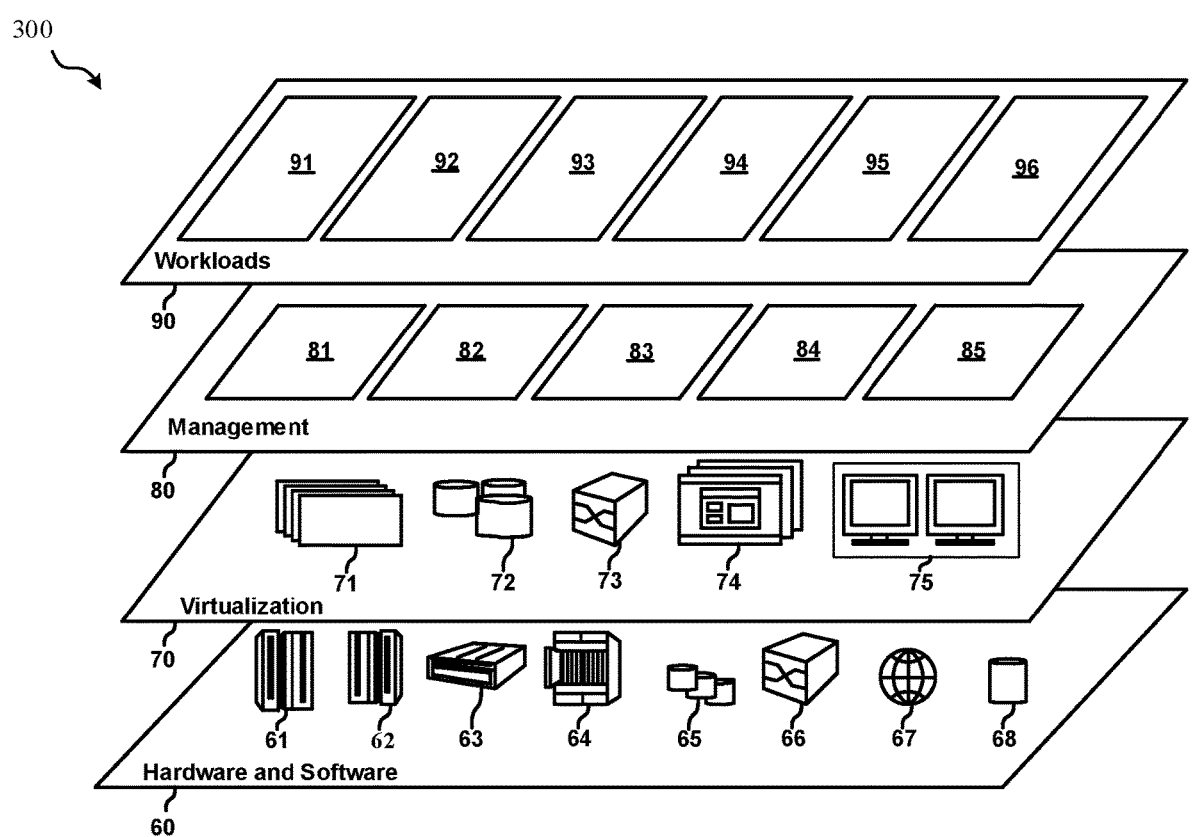
FIG. 3 depicts abstraction model layers, according to some embodiments.

Referring now to FIG. 3, a set of functional abstraction layers 300 provided by cloud computing environment 50 (FIG. 2) is shown, according to some embodiments. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive network provisioning 96.

The functionalities of adaptive network provisioning 96 will be described in the following embodiment of the present disclosure.

Figure 4:
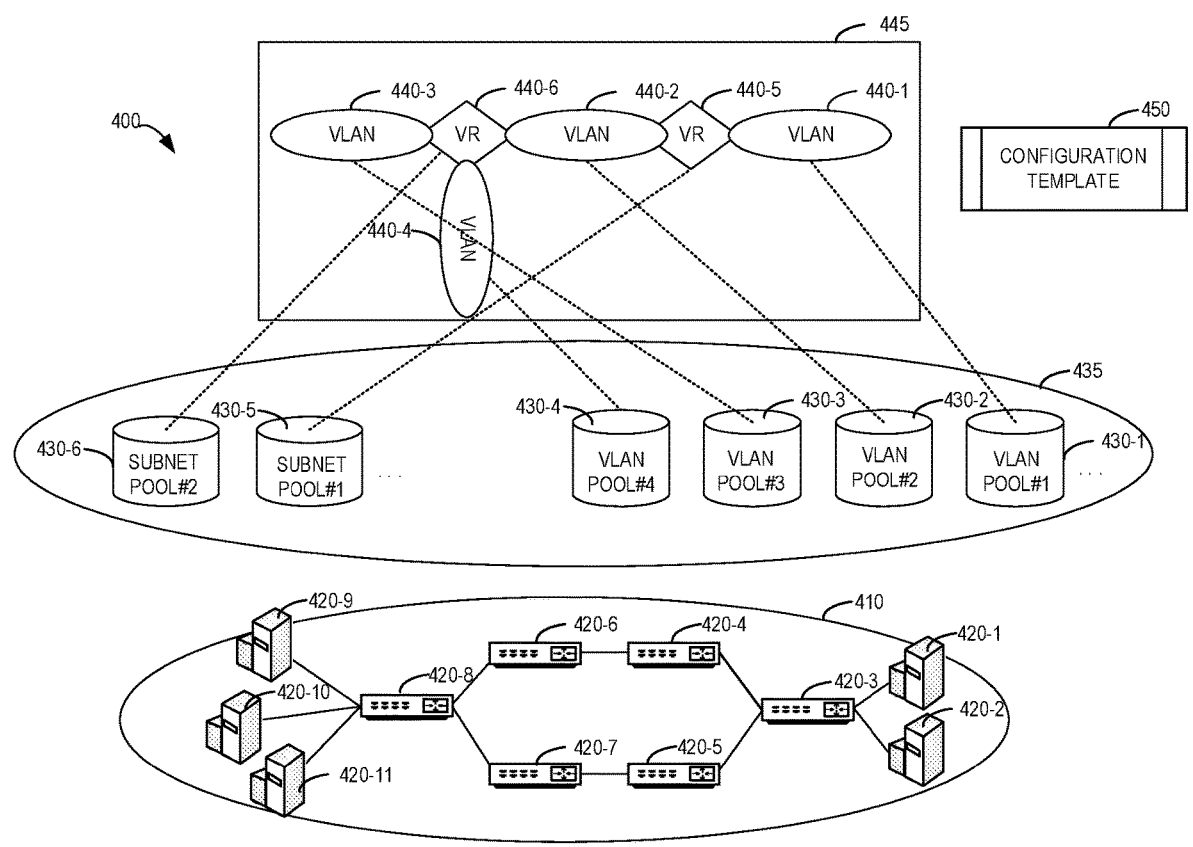
FIG. 4 depicts a simplified diagram of a network virtualization environment in which embodiments of the present disclosure can be implemented, according to some embodiments.

Referring to FIG. 4, an example network virtualization environment 400 is depicted, according to some embodiments. As mentioned above, network virtualization can be used to provision virtual networks on the basis of a physical infrastructure. In some instances, it may be appreciated that the number and arrangement of the elements in FIG. 4 are provided for the purpose of illustration only. The environment 400 may include more, less, and/or different elements and different arrangements.

In the environment 400, virtual network provision is embodied on the basis of a physical infrastructure 410. The physical infrastructure 410 includes various physical entities, such as physical entities 420-1 through 420-11 (collectively or individually referred to as physical entities 420), to provide physical resources.

The physical entities 420 may also be referred to as physical devices or infrastructure devices. In some embodiments, the physical entities 420 may include various types of devices, examples of which include, but may not be limited to, physical computing devices (for example, servers, mainframes, computing workstations, and the like), storage devices (for example, memories, disks, transitory or non-transitory storage medium, and the like), network devices (for example, physical network input/output (I/O) adapters, routers, physical network interfaces (NICs), busses, connectors, adaptors, switches, stations, and the like), and/or other types of devices. The physical entities 420 may connect with each other to form one or more physical networks.

By applying virtualization on the physical infrastructure 410, the physical entities of the physical infrastructure 410 may be abstracted as virtual resources included in a virtual resource pool 435. Such virtual resources may be referred to as virtual entities or virtual devices, each mapped to one or more physical entities 420 of the physical infrastructure 410. A virtual entity may perform a corresponding function as defined with the support of the corresponding physical entities 440.

In some embodiments, the virtual entities may include virtual network devices. In the example of FIG. 4, virtual entities are shown to include Virtual Local Area Networks (VLANs) and virtual router (VR) subnetworks (subnets), where VLANs are arranged in VLAN pools 430-1 through 430-4 and subnets are arranged in subnets 430-5 and 430-6. Although not shown, the virtual entities may include other types of entities, for example, one or more layer 2 networks (such as Virtual eXtensible Local Area Networks (VXLANs)), virtual machines (VM), virtual switches, virtual NICs, virtual firewalls, virtual load balancers, and/or any other devices used to form a network).

The virtual resource pool 435 may be shared by multiple tenants or multiple applications. If a new tenant or a new application is to be deployed in the environment 400, an associated virtual network 445 may be provisioned to host the new tenant or new application. As used herein, an application is to provide a certain service for end users of the environment 400, and a tenant is allowed to provide one or more applications in the virtual network. The virtual network 445 can be orchestrated with one or more of the virtual entities in the virtual resource pool 435. In some embodiments, a virtual network may be regarded as a zone specific to the tenant or application. Different virtual networks may be logically separated from each other although they share the same physical infrastructure 410.

During the network provisioning, available virtual entities from the virtual resource pool 435, such as the VLAN pools 430-1 through 430-4 and subnets 430-5 and 430-6, may be determined and reserved for the virtual network 445. In the example of FIG. 4, the virtual network 445 is orchestrated with VLANs 440-1 through 440-4 from the VLAN pools 430-1 through 430-4, respectively, and VRs 440-5, 440-6 from subnet pools 430-5, 430-6. The settings of the virtual entities used in the virtual network 445 may be specified, for example, by network administrators. The physical entities in the physical infrastructure 410, which are virtualized to support the reserved virtual entities 420, may be configured accordingly to provision the virtual network 445.

In some embodiments, a configuration template 450 may be predefined to facilitate the network provisioning. The configuration template 450 may contain configuration statements to configure the physical infrastructure 410 and, more specifically, one or more physical entities 420 in the physical infrastructure 410, in order to provision one or more virtual entities in a virtual network. The mapping between virtual entities and physical entities may be predefined in the configuration template 450. In provisioning the virtual network 445, the virtual entities reserved for this virtual network from the virtual resource pool 435 may be specified into the configuration statements of the configuration template 450. The configuration information may be generated based on the configuration template 450 and used to configure the physical entities 420 to provision the specified virtual entities and thus the whole virtual network 445.

For example, if the network administrator decides to reserve the VLAN 440-1 from the VLAN pool 430-1 for the virtual network 445, the identity of the VLAN 440-1 can be specified into the configuration template 450. By applying the configuration template 450 with the virtual entity specified, configuration information may be generated and issued to one or more corresponding physical entities 420 to configure those entities to act as the VLAN 440-1. The configuration template 450 may allow configuring other physical entities to provision the virtual entities in the virtual network 445.

Typically, virtual networks created on a same configuration template may have the same network topology while the virtual entities contained in those virtual networks may be varied as the network administrator defines. In some embodiments, more than one configuration template may be utilized in provisioning a virtual network. In some embodiments, a plurality of configuration templates may be provided for selection to define virtual networks with different network topologies.

Although the use of the configuration template can simplify the network provisioning process, the template may be prone to be outdated if the underlying physical infrastructure is changed, for example, by adding, deleting, and/or replacing some of the physical entities or their connections. This is because the mapping between the virtual entities in the virtual resource pool and the physical entities will be changed if the physical infrastructure is changed. If the outdated configuration template is still employed to provision new virtual networks in the case that the physical infrastructure is changed, incorrect configurations may be issued to the physical entities, resulting in failed network provisioning and sometimes network outage.

Here, since the configuration template may be manually maintained, the network administrator maintaining the configuration template may not update the configuration template until a technical problem is reported. In conventional systems, there may not be any available solution to automatically update the configuration template for network provisioning.

In some embodiments of the present disclosure, if a physical infrastructure is updated, it is proposed to determine configuration information that is active for configuring the updated physical infrastructure to provision a virtual network that is already deployed. Such configuration information may be compared with historical configuration information that was previously generated based on a configuration template for configuring the physical infrastructure before it is updated to provision the virtual network. Differential information may be determined through the comparison, and may be used to update the configuration template. As such, the configuration changes on the physical infrastructure can be learned from the already deployed virtual network and may be included into the configuration template. Through this solution, the configuration template can be adapted to the changed physical infrastructure. One or more further virtual networks may be correctly provisioned by the updated physical infrastructure based on the updated configuration template.

Other advantages will be described with reference to the example embodiments of the present disclosure and the accompanying drawings below.

Figure 5:
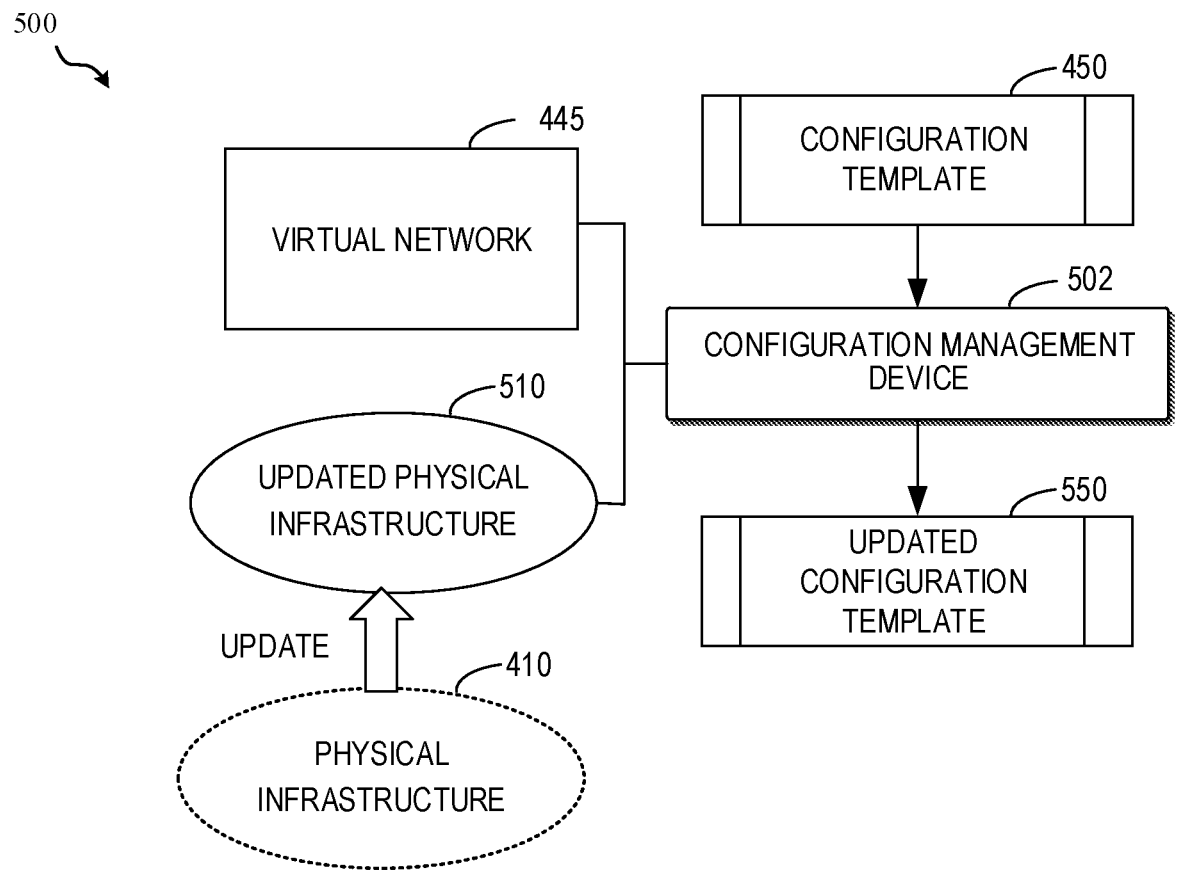
FIG. 5 depicts a block diagram of a system for adaptive network provisioning, according to some embodiments.

Referring now to FIG. 5, a block diagram of a system 500 for adaptive network provisioning is depicted, according to some embodiments. The system 500 includes a configuration management device 502 configured to manage the configuration template 450 used for the network provisioning in the network virtualization environment 400 shown in FIG. 4. For ease of discussion, the system 500 will be described with reference to FIG. 4. In some embodiments, the configuration management device 502 may be implemented by computer system/server 12 of FIG. 1.

In embodiments of the present disclosure, the physical infrastructure 410 is configured to provision the virtual network 445. Configuration information used to configure the physical infrastructure 410 may be generated based on the configuration template 450. During operation, the physical infrastructure 410 is updated to updated physical infrastructure 510 for various reasons, such as network scaling, device failure, and/or any other possible requirements. Virtual entities in the virtual resource pool 435 may be virtualized from the physical infrastructure 510, and the virtual network 445 may be provisioned by the updated physical infrastructure 510. In such scenario, the configuration management device 502 may be triggered to update the configuration template 450 to be an updated configuration template 550 in order to adapt to the change(s) made on the underlying physical infrastructure. The detailed operations of the configuration management device 502 in updating the configuration template will be described with reference to FIG. 6.

FIG. 6 illustrates a flowchart of an example method 600 of updating a configuration template, according to some embodiments of the present disclosure, which may be implemented by the configuration management device 502.

At block 610, the configuration management device 502 determines whether the physical infrastructure 410 is updated. In some embodiments, the configuration management device 502 may periodically check whether there is any change on the physical infrastructure 410. Alternatively, or in addition, an event of reporting the update of the physical infrastructure 410 may be actively provided to the configuration management device 502, for example, from one or more physical entities 420 on which an update(s) are made or from a central control device of the physical infrastructure 410.

In some embodiments, an update to the physical infrastructure 410 may include, for example, additions of one or more new physical entities, deletion of one or more existing physical entities 425, rearrangement of one or more existing physical entities 420, replacement of one or more existing physical entities 420 with one or more new physical entities, and/or the like. The configuration management device 502 may keep monitoring if the physical infrastructure 410 is updated.

If the physical infrastructure 410 is updated, for example to be the updated physical infrastructure 510, at block 620 the configuration management device 502 determines active configuration information for configuring the updated physical infrastructure 510 to provision a virtual network 445.

One of the objectives of the method 600 may be to adapt a certain configuration template 450 to the changed physical infrastructure. The configuration template 450 to be adapted is associated with the virtual network 445, and may be previously used to previously generate configuration information for this virtual network 445. In some cases, a plurality of virtual networks may have been provisioned on the physical infrastructure 410 based on the configuration template 450. The configuration management device 502 may select one of the virtual networks as a reference virtual network and obtain configuration information active in the physical infrastructure 410 for this reference virtual network.

Generally, if the physical infrastructure 410 is changed to the updated physical infrastructure 510, an existing virtual network(s) including the virtual network 445 deployed on the physical infrastructure 410 is migrated onto the updated physical infrastructure 510 so that the virtual network 445 can still operate normally even if the underlying physical infrastructure is changed. The migration of the existing virtual network(s) may be a part of the updating process of the physical infrastructure. Such migration may involve reconfiguring the physical entities in the updated physical infrastructure 510 in such a way that the physical entities can be mapped correctly to the virtual entities in the existing virtual network(s). For example, if there are more physical NICs added in the updated physical infrastructure 510 to improve the network connectivity capability, the added physical NICs may be configured to be mapped to one or more virtual NICs used in the VLANs in the virtual resource pool 435. The reconfiguration of the updated physical infrastructure 510 generally may not require updates to the virtual resource pool 435.

After the existing virtual network(s) have been migrated onto the updated physical infrastructure 510, the updated physical infrastructure 510, more specifically, the corresponding physical entities within the updated physical infrastructure 510 can provision the existing virtual network(s) including the virtual network 445 according to the active configuration information.

The active configuration information may be obtained from the updated physical infrastructure 510. More specifically, the information may be obtained from one or more physical entities in the updated physical infrastructure 410 mapped to provision one or more virtual entities of the virtual network 445. In some embodiments, the configuration management device 502 may collect configuration-related data from the updated physical infrastructure 510. For example, configuration management device 502 may require respective physical entities included in the updated physical infrastructure 510 to provide their configuration information. The configuration-related data are all currently active on the updated physical infrastructure 510. As the updated physical infrastructure 510 may be shared by a plurality of virtual networks, the collected configuration-related data may be related to the plurality of virtual networks. Thus, the configuration management device 502 may extract the active configuration information corresponding to the virtual network 445 from the collected configuration-related data.

The collected configuration-related data may include configuration statements for the provisioned virtual networks. The configuration management device 502 may extract, from the collected configuration-related data, the part of data, for example, one or more configuration statements that specify the active identification information for the virtual network 445. The identification information may include, for example, a direct identification of the virtual network 445, an identification of a tenant of the virtual network 445, an application of the virtual network 445, or the like. In some embodiments, the virtual network 445 may be orchestrated with one or more dedicated virtual entities. Thus, the configuration management device 502 may use an identification(s) of such dedicated virtual entities to extract the active identification information for the virtual network 445.

In some embodiments, the configuration management device 502 may provide the identification information to the physical entities in the updated physical infrastructure 510, to request one or more corresponding physical entities to provide configuration information elements related to the virtual network 445 only.

At block 630, the configuration management device 502 obtains historical configuration information for configuring the physical infrastructure 410 to provision the virtual network 445. The historical configuration information is generated based on a configuration template 450. As introduced briefly above, before the physical infrastructure 410 is updated, the virtual network 445 may have been provisioned on the physical infrastructure 410 previously based on the historical configuration information.

In some embodiments, in addition to being provided to the physical infrastructure 410, the historical configuration information for the virtual network 445 may also be maintained at a management layer, for example, in a storage system accessible by the configuration management device 502. Accordingly, the configuration management device 502 may retrieve the historical configuration information from the storage system.

Upon the determination of the active configuration information and the historical configuration information for the virtual network 445, at block 640, the configuration management device 502 determines differential information between the active configuration information and the historical configuration information, for example, by comparing the active configuration information and the historical configuration information. The differential information may indicate one or more configuration changes after the physical infrastructure is updated, which can be used to facilitate template update. Therefore, at block 650, the configuration management device 502 updates the configuration template 450 based on the determined differential information, to generate the updated configuration template 550.

In some embodiments, if there are addition, deletion, rearrangement, replacement, and/or other changes of one or more physical entities, the active configuration information may be different from the historical configuration information. In some examples, if one or more physical entities are added, by comparing the active and historical configuration information, the resulting differential information may accordingly indicate one or more additional configuration statements that are added in the active configuration information. The additional configuration statement(s) may specify how the newly added physical entities are mapped to the virtual entities. The configuration management device 502 may determine to combine such additional configuration statements into the configuration template 450 to generate the updated configuration template 550.

In some examples, if one or more physical entities in the physical infrastructure 410 are deleted from the updated physical infrastructure 510, the differential information may accordingly indicate one or more configuration statements deleted from the actual configuration information as compared with the historical configuration information. The configuration management device 502 may determine to delete the corresponding configuration statements from the configuration template 450 to obtain the updated configuration template 550.

In some examples, if one or more physical entities are rearranged or replaced by one or more other physical entities, the differential information may accordingly indicate that one or more configuration statements in the historical configuration information should be changed to be one or more different configuration statements in the active configuration information. In such case, the configuration management device 502 may determine to replace the corresponding configuration statements in the configuration template 450 to be the one or more different configuration statements identified from the active configuration information.

As the active configuration information and the historical configuration information are specific to the virtual network 445, there may be some part of configuration information, such as one or more configuration statements, that may not be suitable to be directly included into the configuration template. In generating the updated configuration template 550, the configuration management device 502 may identify, from one or more configuration statements indicated by the differential information, which part is a parametric item and which part is a common item.

A parametric item is generally specific to a virtual network. For example, a parametric item may include identification information of the tenant or application associated with the virtual network 445, the identification of the virtual network 445, and/or the like that are defined to be specific to the virtual network 445. A common item is common to all virtual networks that have been generated or to be generated based on a same configuration template. Such common item is usually associated with one or more physical entities in the physical infrastructure.

As a specific example, if a new NIC identified by "1111" is added, the differential information may indicate a new configuration statement from the active configuration information for the virtual network 445. The new configuration statement may specify the following: set a configuration of VLAN 440-1 for tenant ABC of virtual network 445 to be NIC 1111, Port 122, Unit 14. Within the above configuration statement, the parametric item may include "tenant ABC," "virtual network 445," and "VLAN 440-1" which are specific to the virtual network 445. Other items, such as "NIC 1111," "Port 122," and "Unit 14," are common items learned from the active configuration information. The configuration management device 502 may determine from such common items that new physical entities are available in the underlying physical infrastructure for use in network virtualization. Such common items may be incorporated in the configuration template for future network provisioning.

Although the virtual entity such as "VLAN 440-1" in the above specific example is determined to be a parametric item, it is noted that depending on the network virtualization techniques used, the virtual entities such as the VLANs, subnets, and the like, may not be dedicated to specific virtual networks. In such cases, the virtual entities specified in the configuration statement may be identified as common items instead of parametric items.

After identifying the parametric item(s) and common item(s) from the configuration statement(s) indicated by the differential information, the configuration management device 502 may remove the parametric item(s). The configuration statement(s) with the parametric item(s) may be used to update the configuration template 450 as described above, to generate the updated configuration template 550.

According to the embodiments of the present disclosure, it is possible to automatically keep the configuration template adapted to the updated physical infrastructure by learning the active configuration information from the existing virtual network in a heuristic manner. The automatic updating method can be applied to different virtualization environments with different infrastructures without customization.

The updated configuration template may be further used to generate new virtual networks. As such, new network provisioning can be adaptive to the updated physical infrastructure by using the updated configuration template.

Figure 7:
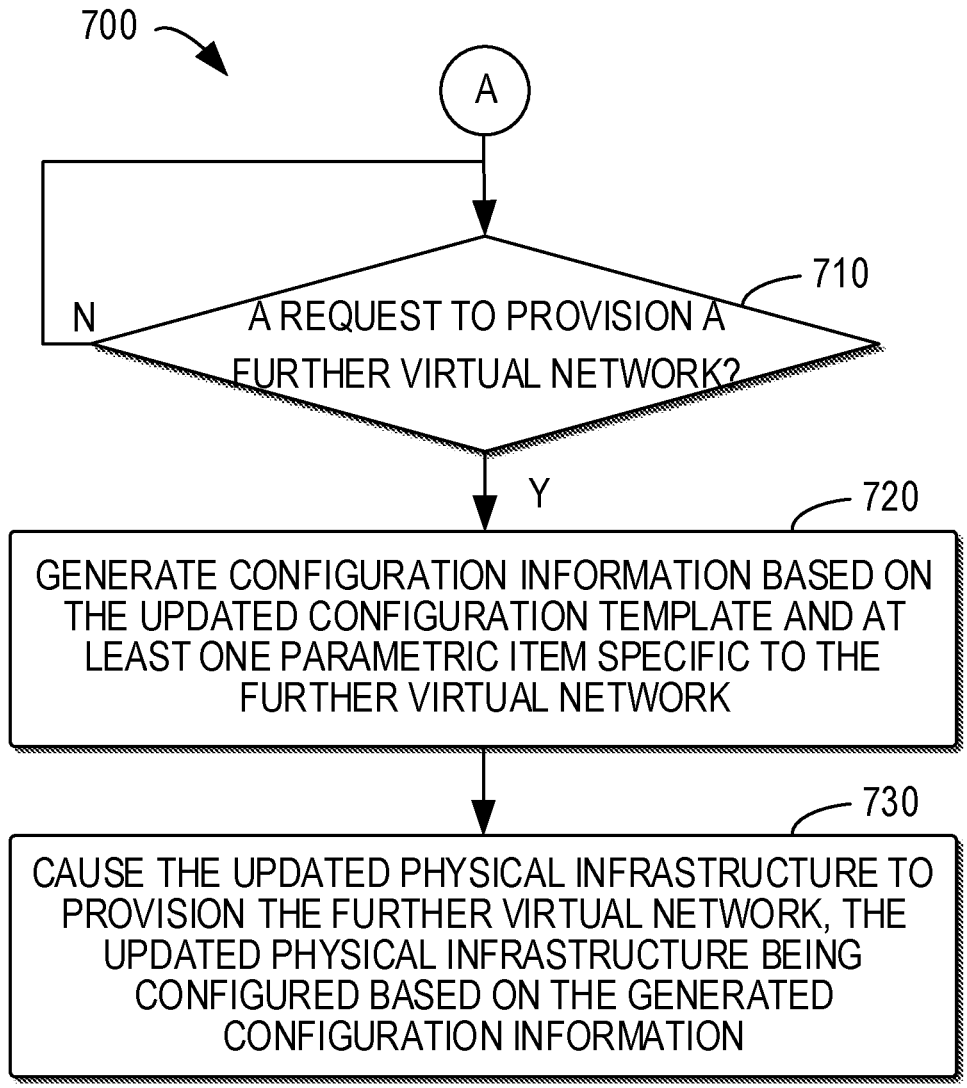
FIG. 7 depicts a flowchart of an example method of updating a configuration process, according to some embodiments.

FIG. 7 illustrates a flowchart of an example method 700 of generating configuration information according to some embodiments of the present disclosure. The method 700 may be implemented by the configuration management device 502, or may be implemented by a different device which is responsible for the virtual network provisioning. For ease of discussion, the method 700 is described from the perspective of the configuration management device 502.

At block 710, the configuration management device 502 determines whether a request to provision a further virtual network on the updated physical infrastructure 550 is detected. If such a request is detected the configuration management device 502 generates, at block 720, configuration information based on the updated configuration template 550 and at least one parametric item being specific to the further virtual network. The at least one parametric item may be filled into the corresponding configuration statement(s) included in the updated configuration template 550. The at least one parametric item may be received along with the request and may be defined, for example, by a network administrator for the environment 400.

At block 730, the configuration management device 502 causes the updated physical infrastructure 510 to provision the further virtual network by configuring the updated physical infrastructure 510 based on the generated configuration information. The configuration information may be provided by the configuration management device 502 to one or more physical entities in the updated physical infrastructure 510 that are mapped to one or more virtual entities included in the further virtual network, as the configuration template specified.

Figure 8:
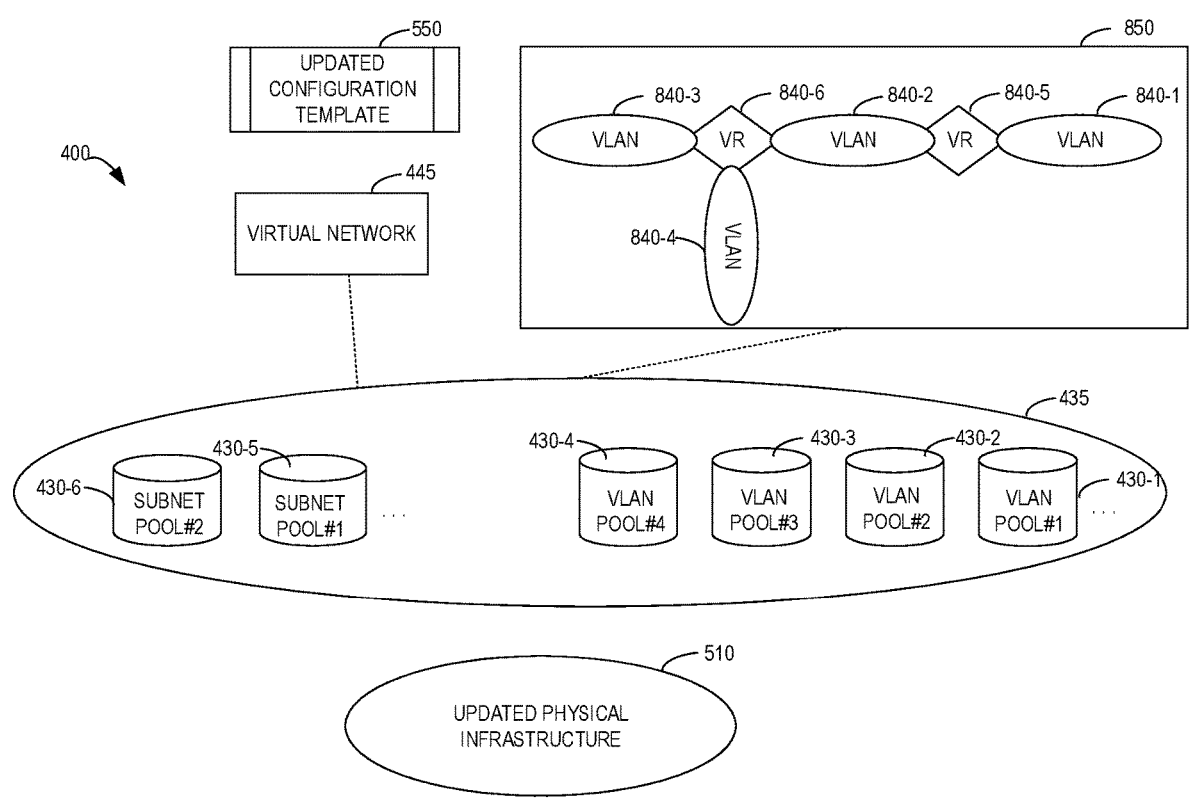
FIG. 8 depicts a simplified diagram for provisioning a virtual network, according to some embodiments.

FIG. 8 depicts a simplified diagram for provisioning a new virtual network 850 in the environment 400 according to the updated configuration template 550. After being deployed, the new virtual network 850 is provisioned by the updated physical infrastructure 510 to serve end users of this network. In the example of FIG. 8, the virtual network 850 is orchestrated with VLANs 840-1 through 840-4 from the VLAN pools 430-1 through 430-4, respectively, and VRs 840-5 and 840-6 from subnet pools 430-5 and 430-6.

While operations of the method are depicted in a particular order, it should not be understood as requiring that such operations are performed in the particular order as shown in a sequential order, or that all illustrated operations be performed, to achieve desirable results. In certain circumstances, multitasking and parallel processing may be advantageous. For example, the operation at block 630 of the method 600 may be performed in a reverse order or in parallel with the operations at blocks 610, 620.

It should be noted that the processing of adaptive network provisioning or the configuration management device 502 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining that a physical infrastructure is updated, resulting in an updated physical infrastructure;
    determining, in accordance with the determination that the physical infrastructure is updated, active configuration information for configuring the updated physical infrastructure to provision a virtual network;
    obtaining historical configuration information for configuring the physical infrastructure to provision the virtual network, wherein the historical configuration information is generated based on a configuration template;
    determining differential information between the active configuration information and the historical configuration information; and
    updating the configuration template based on the determined differential information, wherein the updated configuration template comprises an updated mapping between virtual entities in a virtual resource pool and physical entities for the updated physical infrastructure.

2. The method of claim 1, further comprising:
    generating, in accordance with a request to provision a further virtual network, configuration information based on the updated configuration template and at least one parametric item specific to the further virtual network; and
    causing the updated physical infrastructure to provision the further virtual network, wherein the updated physical infrastructure is configured based on the generated configuration information.

3. The method of claim 1, wherein updating the configuration template comprises:
    identifying a parametric item in a configuration statement indicated by the differential information, wherein the parametric item is specific to the virtual network;
    removing the parametric item from the differential information; and
    updating the configuration template based on the configuration statement with the parametric item removed.

4. The method of claim 1, wherein updating the configuration template comprises:
    identifying a common item in a configuration statement indicated by the differential information, wherein the common item is associated with a physical entity in the physical infrastructure and is common to virtual networks generated based on the configuration template; and
    updating the configuration template based on the common item.

5. The method of claim 1, wherein updating the configuration template comprises:
    determining that the differential information indicates a configuration statement is being added in the active configuration information; and
    combining, in accordance with the determining that the differential information indicates the configuration statement is being added, the configuration statement into the configuration template.

6. The method of claim 1, wherein updating the configuration template comprises:
    determining that the differential information indicates a configuration statement is being deleted from the historical configuration information; and
    deleting, in accordance with the determining that the differential information indicates a configuration statement is being deleted, the configuration statement from the configuration template.

7. The method of claim 1, wherein updating the configuration template comprises:
    determining that the differential information indicates a first configuration statement in the active configuration information is being changed from a second configuration statement in the historical configuration information; and
    replacing the second configuration statement in the configuration template with the first configuration statement.

8. The method of claim 1, wherein determining the active configuration information comprises:
    collecting configuration-related data from the updated physical infrastructure, wherein the configuration-related data is related to a plurality of virtual networks sharing the updated physical infrastructure; and
    extracting the active configuration information from the configuration-related data based on an identification of at least one of the virtual network, wherein a virtual entity is dedicated to at least one of the virtual network, a tenant of the virtual network, and an application of the virtual network.

9. A system having a memory and one or more computer processors, the system configured to:
    determine that a physical infrastructure is updated, resulting in an updated physical infrastructure;
    determine, in accordance with the determination that the physical infrastructure is updated, active configuration information for configuring the updated physical infrastructure to provision a virtual network;
    obtain historical configuration information for configuring the physical infrastructure to provision the virtual network, wherein the historical configuration information is generated based on a configuration template;
    determine differential information between the active configuration information and the historical configuration information; and
    update the configuration template based on the determined differential information, wherein the updated configuration template comprises an updated mapping between virtual entities in a virtual resource pool and physical entities for the updated physical infrastructure.

10. The system of claim 9, further configured to:
    generate, in accordance with a request to provision a further virtual network, configuration information based on the updated configuration template and at least one parametric item specific to the further virtual network; and
    cause the updated physical infrastructure to provision the further virtual network, wherein the updated physical infrastructure is configured based on the generated configuration information.

11. The system of claim 9, wherein updating the configuration template comprises:

identifying a parametric item in a configuration statement indicated by the differential information, wherein the parametric item is specific to the virtual network;

removing the parametric item from the differential information; and updating the configuration template based on the configuration statement with the parametric item removed.

12. The system of claim 9, wherein updating the configuration template comprises:

identifying a common item in a configuration statement indicated by the differential information, wherein the common item is associated with a physical entity in the physical infrastructure and is common to virtual networks generated based on the configuration template; and updating the configuration template based on the common item.

13. The system of claim 9, wherein updating the configuration template comprises:

determining that the differential information indicates a configuration statement is being added in the active configuration information; and combining, in accordance with the determining that the differential information indicates the configuration statement is being added, the configuration statement into the configuration template.

14. The system of claim 9, wherein updating the configuration template comprises:

determining that the differential information indicates a configuration statement is being deleted from the historical configuration information; and deleting, in accordance with the determining that the differential information indicates a configuration statement is being deleted, the configuration statement from the configuration template.

15. A computer program product comprising a computer readable storage medium having program instructions embodied therewith, the program instructions executable by a server to cause the server to perform a method, the method comprising:

determining that a physical infrastructure is updated, resulting in an updated physical infrastructure;

determining, in accordance with the determination that the physical infrastructure is updated, active configuration information for configuring the updated physical infrastructure to provision a virtual network;

obtaining historical configuration information for configuring the physical infrastructure to provision the virtual network, wherein the historical configuration information is generated based on a configuration template;

determining differential information between the active configuration information and the historical configuration information; and updating the configuration template based on the determined differential information, wherein the updated configuration template comprises an updated mapping between virtual entities in a virtual resource pool and physical entities for the updated physical infrastructure.

16. The computer program product of claim 15, wherein the method further comprises:

generating, in accordance with a request to provision a further virtual network, configuration information based on the updated configuration template and at least one parametric item specific to the further virtual network; and causing the updated physical infrastructure to provision the further virtual network, wherein the updated physical infrastructure is configured based on the generated configuration information.

17. The computer program product of claim 15, wherein updating the configuration template comprises:

identifying a parametric item in a configuration statement indicated by the differential information, wherein the parametric item is specific to the virtual network;

removing the parametric item from the differential information; and updating the configuration template based on the configuration statement with the parametric item removed.

18. The computer program product of claim 15, wherein updating the configuration template comprises:

identifying a common item in a configuration statement indicated by the differential information, wherein the common item is associated with a physical entity in the physical infrastructure and is common to virtual networks generated based on the configuration template; and updating the configuration template based on the common item.

19. The computer program product of claim 15, wherein updating the configuration template comprises:

determining that the differential information indicates a first configuration statement is being added in the active configuration information;

combining, in accordance with the determining that the differential information indicates the first configuration statement is being added, the first configuration statement into the configuration template;

determining that the differential information indicates a second configuration statement is being deleted from the historical configuration information;

deleting, in accordance with the determining that the differential information indicates a second configuration statement is being deleted, the second configuration statement from the configuration template;

determining that the differential information indicates a third configuration statement in the active configuration information is being changed from a fourth configuration statement in the historical configuration information; and replacing the fourth configuration statement in the configuration template with the third configuration statement.

20. The computer program product of claim 15, wherein determining the active configuration information comprises:

collecting configuration-related data from the updated physical infrastructure, wherein the configuration-related data is related to a plurality of virtual networks sharing the updated physical infrastructure; and extracting the active configuration information from the configuration-related data based on an identification of at least one of the virtual network, wherein a virtual entity is dedicated to at least one of the virtual network, a tenant of the virtual network, and an application of the virtual network.

* * * * *